Feb. 7, 1928.
O. C. TRAVER
1,658,660
SIGNALING SYSTEM
Filed March 30, 1927
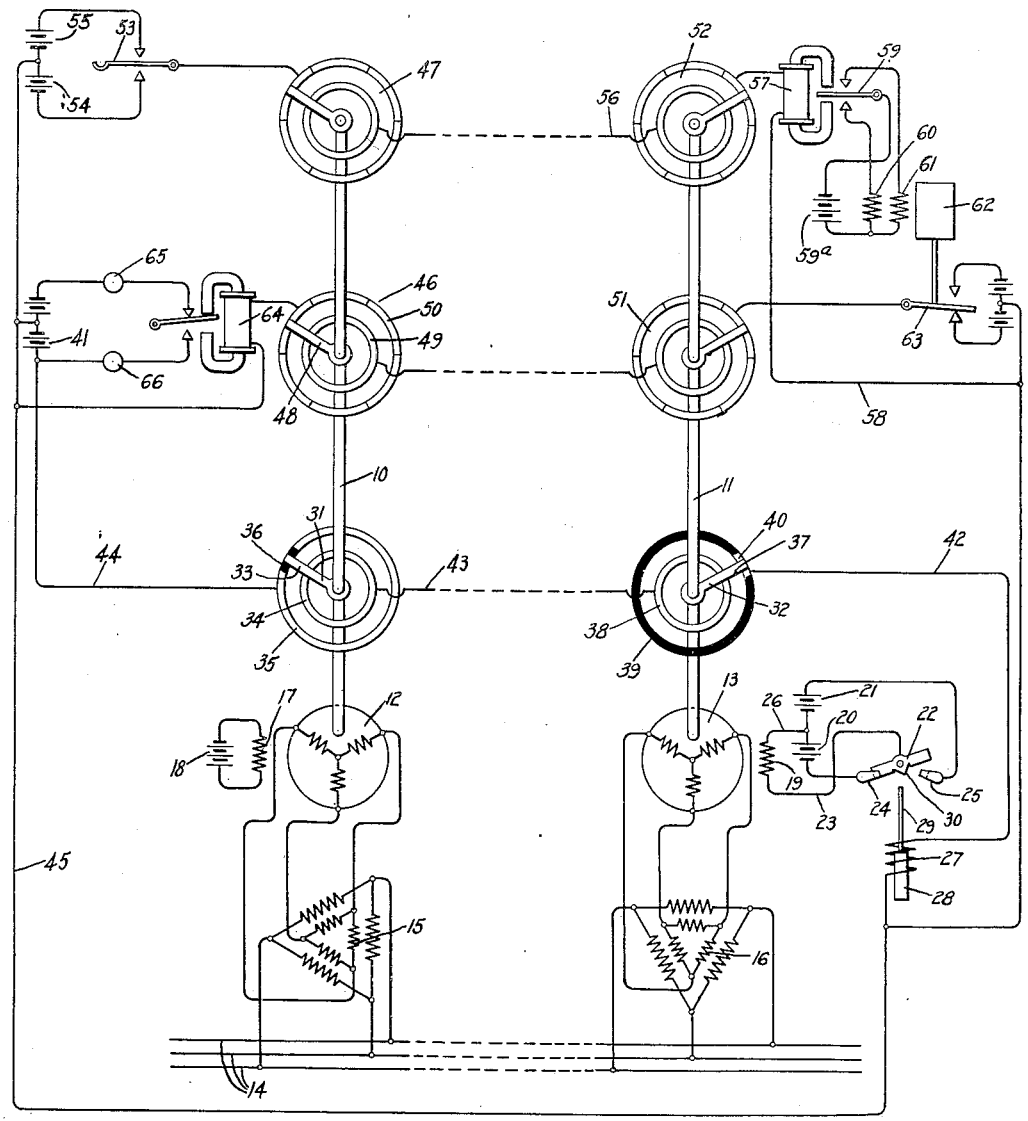
Inventor:
Oliver C. Traver,
by [signature]
His Attorney.

Patented Feb. 7, 1928.

1,658,660

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

SIGNALING SYSTEM.

Application filed March 30, 1927. Serial No. 179,672.

My invention relates to signaling systems, more specifically to signaling systems wherein two members are rotated in synchronism in remotely situated transmitting and receiving stations, and has for its object the provision of simple and reliable means for maintaining synchronism between the two rotating members.

In carrying out my invention, I drive the rotating members by electrical synchronous motors, and provide means responsive to the angular relation of the rotating members for reversing the field of one of said motors when the angular relation of the rotating members varies a predetermined amount so as to cause the motor to slip one or more poles as the case may be and thereby bring its driven member into angular agreement with the other rotating member.

For a more complete understanding of my invention, reference should be had to the accompanying drawing, the single figure of which is a diagrammatic representation of a signaling system embodying my invention.

Referring to the drawing, I have shown my invention in one form in connection with a system for remotely controlling circuit breakers, although it obviously has application to various other systems. The system comprises two shafts 10 and 11 which are located at the transmitting and receiving stations, respectively, which stations, it will be understood, may be a considerable distance apart, perhaps a number of miles apart. These shafts are driven by synchronous motors 12 and 13, respectively, which are preferably polyphase motors and are shown as three-phase synchronous motors. The motors are connected to electrical supply mains 14 extending between the transmitting and receiving stations, and are connected to a suitable three-phase source of electrical supply. Ordinarily, the mains 14 will be connected to a high voltage supply source. In the system disclosed, the transmitting or sending station is located at a central generating station from which high tension feeders extend out to various substations, and it is intended that the mains 14 will be these high tension feeders. Three-phase transformers 15 and 16 are provided to supply electrical energy at a reduced voltage to the motors 12 and 13, respectively.

The motor 12 is provided with a field winding 17 which is energized from a suitable direct current source, such as a storage battery 18. The motor 13 is provided with a field winding 19 which may be energized from either one of two sources of direct current, shown as storage batteries 20 and 21, whereby the polarity of the field may be reversed. This reversing operation may be effected by means of a pivoted switch arm 22 which is electrically connected by conductor 23 to one terminal of the field 19 and arranged to cooperate with one or the other of two stationary contacts 24 and 25, which are electrically connected to terminals of opposite polarity of the two batteries. The remaining two terminals of the batteries are connected by a conductor 26 to the opposite terminal of the field 19. It will thus be observed that when the switch arm 22 is in engagement with the stationary contact 24, as shown in the drawing, the field winding 19 will be energized in one direction by the battery 20, while when the switch arm is in engagement with the contact 25 the field 19 will be energized in an opposite direction by the battery 21. The switch arm 22 is operated by means of a magnet coil 27 provided with an armature 28 which is lifted when the coil is energized to throw the switch arm from one position to another. This operating mechanism may be of any suitable type, and, as shown, the armature 28 is provided with a flexible member 29, while a V shaped projection 30 is provided on the lower side of the switch arm at the center thereof. When the coil 27 is energized, the flexible arm 29 moves the switch arm 22 about its pivot, thereby moving the projection 30 so as to cause the switch arm to be reversed when the magnet coil is next energized, as described for example in Patent No. 400,726 to Balet, dated April 2, 1889.

This reversing mechanism for the field 19 of the motor 13 is provided to enable the field to be reversed one or more times, as required, when the angular relation between the shafts 10 and 11 varies beyond predetermined limits whereby the rotor of the motor 13 is caused to slip a pole for each reversal and thereby bring the shaft 11 which it drives into synchronism with the shaft 10. In order to control this reversal of the field 10, the shafts are provided with contact devices comprising contact arms 31 and 32, respectively, which are driven with the shafts. The contact arm 31 is provided with a bridging member 33 which bears on two stationary contact rings 34 and 35 having their centers lying on the axis of the shaft 10. The ring 34 is a continuous conducting ring, but the ring 35 is provided with a relatively short segment of insulating material 36 whereby the electrical connection between the two rings is broken when the bridging member 33 rests on the segment 36. A bridging member 37 is likewise provided on the arm 32. This bridging member bears on rings 38 and 39 having their centers lying on the axis of the shaft 11. The ring 38 is a continuous conductor, whereas the ring 39 is made of insulating material with the exception of a relatively short segment 40 which is an electrical conductor. The bridging member 37 thus closes a circuit when it rests on the segment 40.

The magnet coil 27 is connected in an electrical circuit including the two contact devices operated by the shafts 10 and 11 and an electrical supply source shown as a storage battery 41. As shown, one terminal of the coil 27 is connected by a conductor 42 to the segment 40, the ring 38 is connected by a conductor 43 to the ring 34, and the conducting portion of the ring 35 is connected by a conductor 44 to one terminal of the battery 41. The opposite terminal of the battery is connected by a conductor 45 to the remaining terminal of the coil 27. With the shafts 10 and 11 rotating in a predetermined angular relation with respect to each other, the contact devices are adjusted so that the bridging contact 33 rests on the insulating segment 36 at the same time that the bridging segment 37 rests on the conducting segment 40. This occurs once each revolution of the shafts, and it will be observed that as long as the shafts 10 and 11 remain in this predetermined angular relation, the circuit of the coil 27 will not be closed, since when one bridging member is resting on conducting portions of its rings the other bridging member will be resting on an insulating portion of one of its rings. Should the predetermined angular relation between the two shafts vary beyond a predetermined limit, which is fixed by the length of the segments 36 and 40, such as might be caused by a small difference in the speeds of the two motors, fluctuations in the supply circuit, etc., the two bridging members will both rest on conducting portions of their two rings at the same time whereby the coil 27 will be energized and the motor field 19 reversed. The circuit of the coil 27 will be established only as long as the bridging member 37 rests on the conducting segment 40, and will thereafter be broken as the shaft 11 continues its rotation. The circuit of the coil 27 will be closed, however, once each revolution of the shafts as long as the shafts are out of step, whereby the motor 13 is caused to slip one pole each revolution and the shafts thereby brought back to their predetermined angular relation.

In the system shown, the shaft 10 is provided with two contact making devices 46 and 47, each of which comprises an arm 48 secured to the shaft and carrying a bridging contact which bears on an inner conducting ring 49 and an outer ring 50 which is divided into a plurality of conducting segments electrically insulated from each other. Similar contact devices 51 and 52 are provided for the shaft 11. At the sending or transmitting station a control contact key 53 is provided which is electrically connected to one segment of the contact device 47 and may be moved to engage one or the other of two stationary contacts connected to opposite poles of two sources of direct current, such as storage batteries 54 and 55. The inner conducting rings of the devices 47 and 52 are electrically connected by a conductor 56. At the receiving station a polarized relay 57 is provided having one terminal connected to a conducting segment of the device 52 and its other terminal connected through a return conductor 58 and the conductor 45 extending back to the transmitting station to a common connection between the remaining two opposite poles of the batteries 54 and 55. Once each revolution of the shafts 10 and 11 the rotating arms of the devices 47 and 52 rest on the conducting segments to which the key and the polarized relay 57 are connected, as shown in the drawing, whereby by suitably actuating the key 53 a circuit may be established in one direction or the other through the polarized relay 57. The relay operates a contact arm 59 which energizes one or the other of two operating coils 60 and 61 from a battery 59ª to throw a circuit breaker 62 to open or closed position as determined by the energization of the relay 57.

In order to signal back the position of the circuit breaker 62 to the transmitting station, a control key 63 similar to the key 53 is connected to a moving element of the circuit breaker. This control key is connected through the contact devices 46 and 51 to operate a polarized relay 64 at the transmitting station which lights one or the other of two electric lamps 65 and 66 which, for example, may be of different colors so as to indicate to the operator in the transmitting station the exact position of the circuit breaker 62. The electrical connections in the operation of the devices 46 and 51 will be understood from the previous description in connection with the devices 47 and 56. In both cases the wire 45 extending between the transmitting and receiving stations is used as a return circuit, and as previously observed this wire is also used as a return circuit for the operating coil 27.

While the motors 12 and 13 are shown directly connected to the shafts 10 and 11, it will be understood that suitable gearing may be interposed if required, so that the shafts will be rotated at reduced speeds, giving an interval of contact between the contact arms and the various segments over which they are moved, of such duration that the desired electric circuits will be established to operate the various devices. It will be obvious also that this system if desired may be used with wireless transmission or carrier current transmission over existing lines, whereby special lines between the two stations for the control equipment are not required.

While I have described my invention as embodied in concrete form and as operating in a specific manner, in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new, and desire to secure by Letters Patent of the United States, is:

1. Means for operating two synchronous motors in a predetermined angular relation, comprising contact devices operated by said motors arranged to control a circuit when the angular relation of said motors varies beyond predetermined limits, means for reversing the field of one of said motors, and operating means for said reversing means included in said circuit.

2. Means for maintaining a predetermined angular relation between the rotors of two synchronous motors, comprising contact devices operated by said motors respectively arranged to close a circuit when the rotors of said motors vary from a predetermined angular relation, means for reversing the field of one of said motors, electromagnetic operating means for said reversing means, and electrical connections including a supply source, said contact devices, and said operating means, whereby said field is reversed upon a predetermined angular disagreement of said rotors.

3. Means for maintaining a predetermined angular relation between the rotors of two synchronous motors comprising means for reversing the field of one of said motors, electromagnetic operating means therefor, a circuit including a source of electrical supply for said operating means, and electrical circuit controlling means in said circuit operated by said rotors to close a circuit through said operating means when said rotors vary from a predetermined angular relation, whereby the field of said motor is reversed.

4. Means for maintaining a predetermined angular relation between the rotors of two synchronous motors comprising means for reversing the field of one of said motors, electromagnetic operating means therefor, a control circuit for said operating means, and a contact device in said circuit driven by one of said rotors for closing a circuit when said rotor passes through a predetermined angular position, and a contact device in said circuit driven by the other of said rotors for maintaining a circuit open when said rotor passes through a predetermined angular position.

5. A signaling system comprising two rotary members located in transmitting and receiving stations respectively, a synchronous electric motor connected to drive each of said members, and means responsive to the angular relation of said members for reversing the field of one of said motors.

6. The method of adjusting the angular relation of two objects driven by synchronous motors which consists in reversing the field of one of said motors.

7. The method of driving two devices in synchronism which consists in connecting said devices to synchronous motors, and reversing the field of one of said motors to adjust the angular relation of said devices.

In witness whereof, I have hereunto set my hand this 29th day of March, 1927.

OLIVER C. TRAVER.